(12) United States Patent
Smith et al.

(10) Patent No.: US 10,129,404 B2
(45) Date of Patent: *Nov. 13, 2018

(54) SYSTEMS AND METHODS FOR MANAGING MULTI-TENANT CALLBACK SERVICES

(71) Applicant: Echopass Corpoartion, Pleasanton, CA (US)

(72) Inventors: Wesley Smith, Sandy, UT (US); Derek Burdick, Provo, UT (US); Wayne Sheppard, Lakewood, CO (US); Dennis Empey, Santa Clara, CA (US); David Tso, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,266

(22) Filed: Mar. 20, 2017

(65) Prior Publication Data

US 2017/0195490 A1  Jul. 6, 2017

Related U.S. Application Data

(63) Continuation of application No. 14/683,041, filed on Apr. 9, 2015, now Pat. No. 9,602,668, which is a
(Continued)

(51) Int. Cl.
*H04M 3/00* (2006.01)
*H04M 3/523* (2006.01)
(Continued)

(52) U.S. Cl.
CPC ......... *H04M 3/5231* (2013.01); *H04M 3/424* (2013.01); *H04M 3/42229* (2013.01); *H04M 3/5141* (2013.01); *H04M 3/5158* (2013.01); *H04M 3/5175* (2013.01); *H04M 3/5183* (2013.01); *H04M 3/5191* (2013.01); *H04M 3/5233* (2013.01); *H04M 3/5238* (2013.01)

(58) Field of Classification Search
CPC . H04M 3/5231; H04M 3/5183; H04M 3/5238
USPC ....... 379/265.01–265.14, 266.01–266.1, 309
See application file for complete search history.

(56) References Cited

U.S. PATENT DOCUMENTS

| 5,692,033 | A | 11/1997 | Farris |
| 6,049,603 | A | 4/2000 | Schwartz et al. |

(Continued)

FOREIGN PATENT DOCUMENTS

WO  0215030 A1  2/2002

*Primary Examiner* — William Deane, Jr.

(57) ABSTRACT

Systems and methods for managing multi-tenant callback services may be provided via a multi-tenant services integration platform. Several multi-tenant software as a service applications may be offered as a hosted software solution via the multi-tenant services integration platform. Various applications may deploy and support a shared tenant and shared services environment where there can be many different customers (companies and users) running in their own virtual partition from a single application instance. The applications may be multi-tenant aware and integrated into an administration portal which integrates several shared tenant services. The tenant model may allow for customized application configurations to be run from a single application instance. Further, improved methods for providing callback management, calculating estimated wait times and providing for callback initiation may be integrated in such multi-tenant services.

20 Claims, 8 Drawing Sheets

Related U.S. Application Data continuation of application No. 13/480,195, filed on May 24, 2012, now Pat. No. 9,031,223.

(60) Provisional application No. 61/490,035, filed on May 25, 2011.

(51) Int. Cl.
*H04M 3/51* (2006.01)
*H04M 3/42* (2006.01)
*H04M 3/424* (2006.01)

(56) References Cited

U.S. PATENT DOCUMENTS

| | | |
|---|---|---|
| 6,310,952 B1 | 10/2001 | Baldwin et al. |
| 6,697,858 B1 | 2/2004 | Ezerzer et al. |
| 6,788,779 B2 | 9/2004 | Ostapchuck |
| 6,831,966 B1 | 12/2004 | Tegan et al. |
| 6,850,613 B2 | 2/2005 | McPartlan et al. |
| 7,043,007 B2 | 5/2006 | McPartlan et al. |
| 7,079,641 B2 | 7/2006 | Ostapchuck |
| 7,382,773 B2 | 6/2008 | Schoeneberger et al. |
| 7,568,038 B1 | 7/2009 | Ezerzer et al. |
| 7,761,323 B2 | 7/2010 | Rafter et al. |
| 7,813,489 B2 | 10/2010 | Dezonno |
| 8,213,911 B2 | 7/2012 | Williams et al. |
| 8,346,942 B2 | 1/2013 | Ezerzer et al. |
| 8,509,226 B1 | 8/2013 | Murphy et al. |
| 8,595,207 B2 | 11/2013 | McFarlane et al. |
| 8,621,178 B1 | 12/2013 | Lazar |
| 8,635,351 B2 | 1/2014 | Astete et al. |
| 9,031,223 B2 | 5/2015 | Smith et al. |
| 2005/0025303 A1 | 2/2005 | Hostetler, Jr. |
| 2005/0163136 A1 | 7/2005 | Chiu et al. |
| 2006/0256949 A1 | 11/2006 | Noble, Jr. |
| 2007/0189484 A1 | 8/2007 | Gayde et al. |
| 2009/0285380 A1 | 11/2009 | Chen et al. |
| 2010/0014511 A1 | 1/2010 | Ezerzer et al. |
| 2010/0091971 A1 | 4/2010 | Famous |
| 2011/0138027 A1 | 6/2011 | Friedmann et al. |
| 2012/0030167 A1 | 2/2012 | Appiah et al. |
| 2012/0173573 A1 | 7/2012 | Lance et al. |
| 2012/0321070 A1 | 12/2012 | Smith et al. |
| 2013/0139158 A1 | 5/2013 | Astete et al. |
| 2015/0215461 A1 | 7/2015 | Smith et al. |
| 2016/0269556 A1 | 9/2016 | Smith et al. |

Configuration Data

|  | Config Data I | Config Data II | Config Data III |
|---|---|---|---|
| Tenant 1 | X |  | X |
| Tenant 2 |  | X |  |
| Tenant 3 | X | X |  |

Tenant/Agent Applications

|  | App A | App B | App C |
|---|---|---|---|
| Tenant 1 | Agent 1, Agent 6 | Agent 1, Agent 2, Agent 6 | Agent 1, Agent 6 |
| Tenant 2 | Agent 3 | Agent 3, Agent 4 |  |
| Tenant 3 | Agent 5, Agent 6 | Agent 6 | Exclude Agent 6 |

FIG. 4

Estimated Wait Time =

If (SASA > 0)

EWT = (SASA + Queue)

Else

EWT = (((ASA + Queue) * AR * QR) / (SkilledReady + 1))

Agent Ratio (AR) = k / (((SkilledAgents / AllAgents) * 100) + 1), k = 25

Queue Ratio (QR) = m / ((((All Queues / AllAgents) * 100)) / m ^ 2) + 1, m = 10

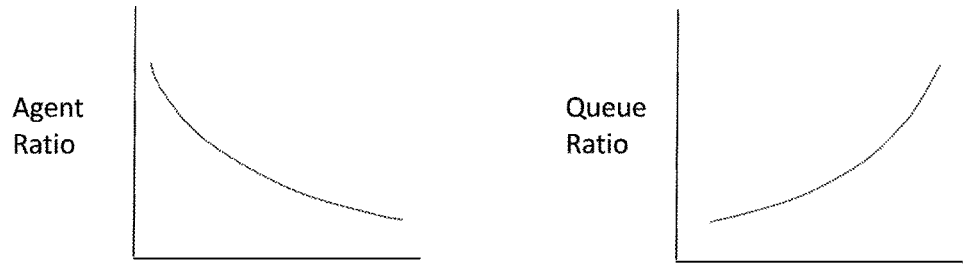

SASA: Average speed of answer computed by skilled agent for the last N seconds by queue Queue: Number of calls currently in queue for the specific skill group ASA: Average speed of answer computed across all queues for the last N seconds AR: Agent Ratio QR: Queue Ratio Skilled Ready: all agents of the target skill set to ready state.

FIG. 7

SYSTEMS AND METHODS FOR MANAGING MULTI-TENANT CALLBACK SERVICES

CROSS-REFERENCE TO RELATED APPLICATIONS

This application is a continuation of U.S. patent application Ser. No. 14/683,041, filed on Apr. 9, 2015, now U.S. Pat. No. 9,602,668, which is a continuation of U.S. patent application Ser. No. 13/480,195, filed on May 24, 2012, now U.S. Pat. No. 9,031,223, which claims the benefit of U.S. Provisional Application No. 61/490,035, filed on May 25, 2011, the disclosures of which are incorporated herein by reference in their entireties.

BACKGROUND

Call or contact centers often use an automatic call distributor (ACD), which is a device or system that distributes incoming calls based on predetermined criteria to contact center agents or resources. ACD systems are utilized in situations where a large volume of incoming phone calls are received from callers who have no need to speak with a specific person but who require assistance from any of multiple persons (e.g., customer service agents or representatives) offered to the caller at the earliest opportunity. Several automated call distribution systems have developed methods of scheduling callback appointments for incoming calls which cannot be serviced efficiently at the time the call is received because no representatives are available and the caller chooses not to wait. The scheduled callback mechanism allows an outbound call to a caller who had placed an earlier incoming call to provide immediate assistance to the callback recipient (the caller) without having to wait on hold for an extended period of time. This is often an option that is good for the caller and good for the company being called that wants to provide a better experience for its customers.

Automated contact centers generally require a system of hardware for terminals and switches, phonelines, and software for the routing strategy that determines where best to send the caller. The routing strategy may match callers up with call agents, using a number of variables. When a caller is offered a callback at a specific time, part of this calculation may include an estimated wait time calculation which is determined based on many variables. In callback systems, it is often a goal to maximize efficiency of resources (which may include the use of hardware, phonelines, and software, as well as the time and availability of agents). Some systems have shared telephony and call center resources to serve multiple tenants (or multiple clients, companies, business units, etc.). For example, two or more separate and distinct companies may share telephony and contact center resources in a multi-tenant environment connecting customer service representatives to their customer bases. There is, however, a need to improve the efficiency of callback services, including by utilizing shared resources and multiple tenant environments so that callback services can be used by many different companies at the same time.

SUMMARY

The invention provides systems and methods for managing multi-tenant callback services. Various aspects of the invention described herein may be applied to any of the particular applications set forth below. The invention may be applied as a standalone multi-tenant callback services management system or as a component of an integrated software solution multi-tenant contact center services. The invention can be optionally integrated into existing business and callback center processes seamlessly. It shall be understood that different aspects of the invention can be appreciated individually, collectively or in combination with each other.

In one aspect of the invention, a system for managing multi-tenant callback services for call centers comprises a plurality of tenants, wherein each tenant provides one or more sets of configuration data; a plurality of call center applications from one or more vendors for assisting a plurality of call center agents; and a queue callback application among the plurality of call center applications for managing callbacks to connect callers to call center agents over a public switched telephone network, wherein each set of configuration data is customized for a tenant and associated with one or more of the plurality of call center applications, wherein the plurality of call center applications can support multiple tenants, utilizing one shared installation of the one or more applications, and wherein each tenant has a virtual partition on which instances of the shared installation of the one or more applications is run.

A method for managing multi-tenant callback services for call centers may be provided in accordance with another aspect of the invention. The method may comprise customizing at least one set of configuration data for an individual tenant of a plurality of tenants, wherein each tenant provides one or more sets of configuration data; associating the at least one set of configuration data with one or more call center application from a plurality of call center applications, wherein the plurality of call center applications are provided from one or more vendors for assisting a plurality of call center agents; and managing callbacks, via a queue callback application among the plurality of call center applications, to connect callers to call center agents over a public switched telephone network, wherein the plurality of call center applications can support multiple tenants, utilizing one shared installation of the plurality of call center applications, and wherein each tenant has a virtual partition on which instances of the shared installation of the one or more applications is run.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4 illustrates how configuration data for each application may be implemented by various tenants and among various agents, in accordance with embodiments of the invention.

FIG. 7 illustrates one example of an equation to calculate estimated wait time for predicting how long a caller will wait in a caller queue before speaking live with a properly skilled agent or resource, in accordance with embodiments of the invention.

DETAILED DESCRIPTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

Figure 1:
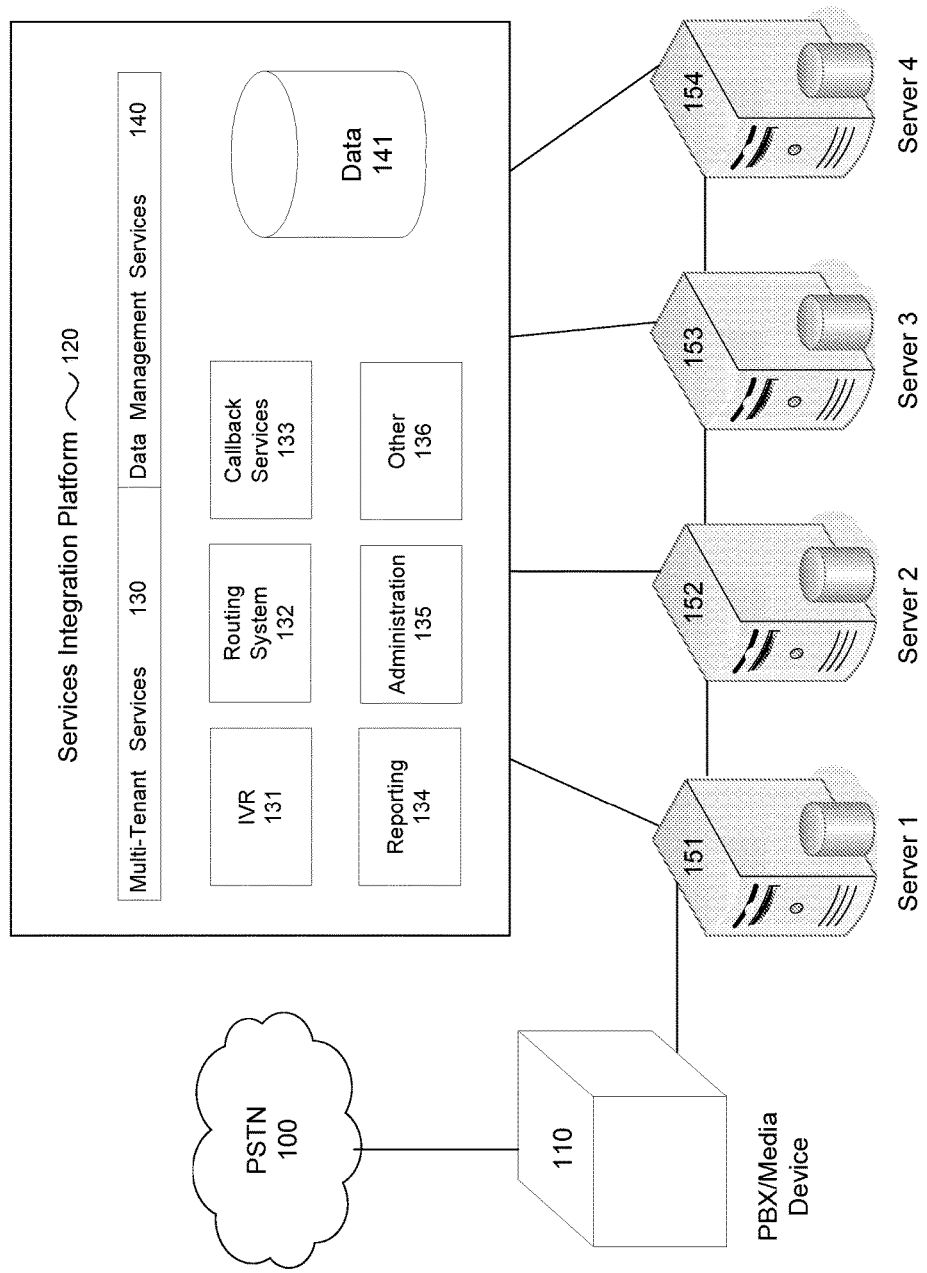
FIG. 1 illustrates an overall architecture of a multi-tenant services integration platform, in accordance with embodiments of the invention.

FIG. 1 illustrates an overall architecture of a multi-tenant services integration platform, in accordance with embodiments of the invention. The services integration platform 120 may operate with the use of several servers 151, 152, 153, and 154. The services integration platform 120 may be accessed by users over a public switched telephone network (PSTN) 100 through a PBX or other media device 110. The services integration platform 120 may be provided as a hosted software service, and may include multi-tenant services 130 and data management services 140. The services integration platform 120 may be an integrated solution which provides such applications as customer interaction management, inbound and outbound dialing, real time and historical reporting that provides views of contact center performance 134, callback services 133, advanced voice platform with a routing system 132, IVR 131, and speech self service, call recording and quality monitoring, workforce management, multi-channel e-services (voice, email, chat and fax), integration with leading CRM systems, custom integrations with multi-vendor call processing and back office systems, end-to-end operating, administration and provisioning environment 135, security maintained at the physical and data levels, and tools for maintaining SAS70 certification and HIPAA compliance.

The services integration platform 120 may deliver several multi-tenant software as a service application 130. Thus, the applications may deploy and support a shared tenant and shared services environment where there can be many different customers (companies and users) running in their own virtual partition from a single application instance. The applications may be multi-tenant aware and integrated into an administration portal which integrates several shared tenant services. The tenant model may allow for customized application configurations to be run from a single application instance. For example, a callback application may use existing routing and reporting objects for call tracking that do not require the addition of specific and proprietary configuration items. Instead, a customer (or tenant) can be segmented into a single virtual location to run from a single application instance.

The services integration platform and/or one or more servers described herein may include a programmable processor capable of executing one or more step, such as those described herein. The services integration platform and/or one or more servers may include a memory capable of storing information, such as non-transitory computer readable media that may include code, logic and/or instructions for one or more steps.

Figure 2:
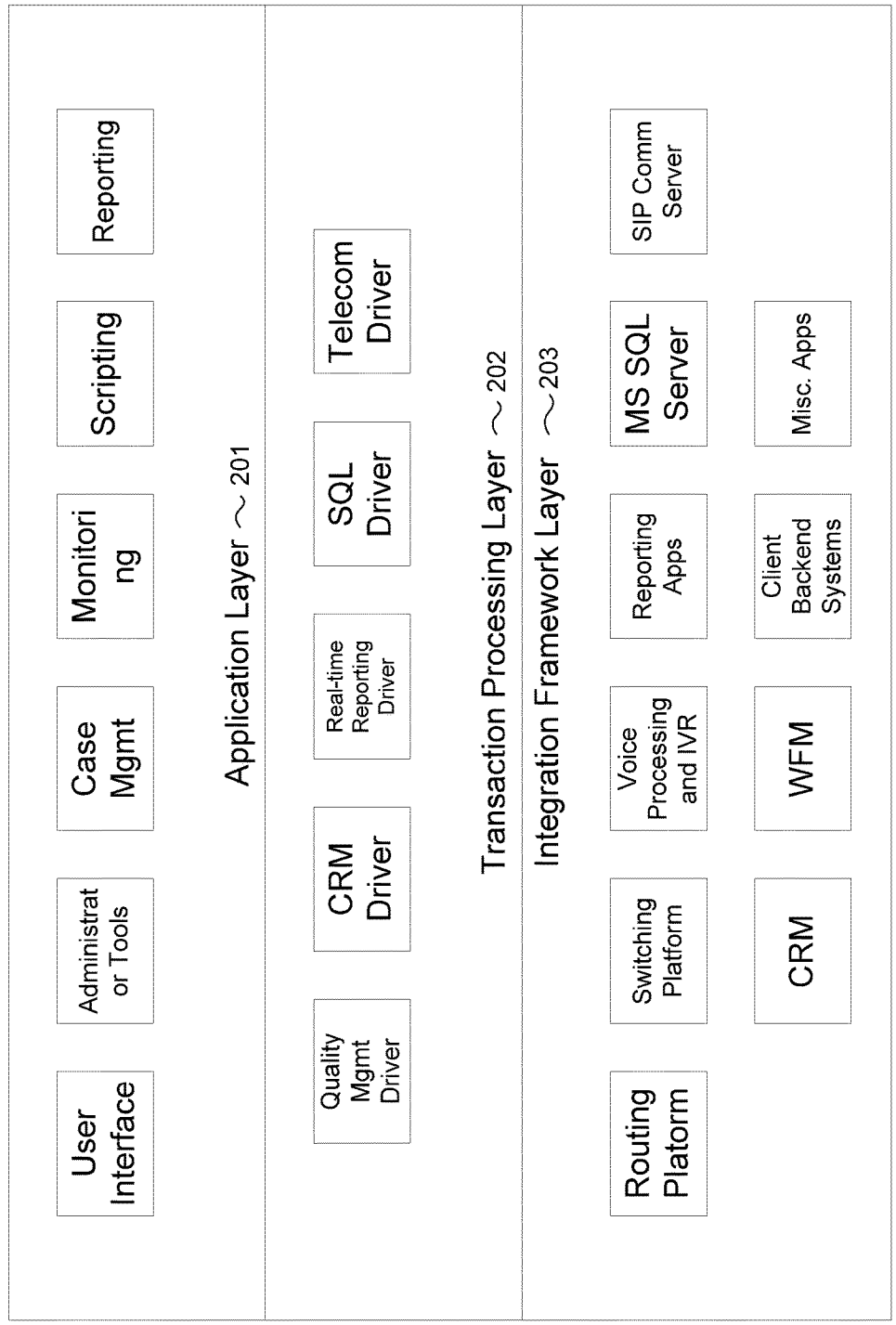
FIG. 2 illustrates an example of how multi-tenancy can be accomplished via various abstraction layers, in accordance with embodiments of the invention.

Referring to FIG. 2, an example of how multi-tenancy can be accomplished via various abstraction layers is illustrated, in accordance with embodiments of the invention. As shown in FIG. 2, the user interface is implemented and abstracted from the underlying infrastructure which may allow the offering of multi-tenancy for offering various services across multiple vendor applications which may be provided by many vendors. As shown, the user interface is accessed through the application layer 201. Various services such as contact, administrative, case, pulse, scripting and reporting services are offered from the application layer 201. Various vendor applications sit within the integration framework layer 203, such as IVR, call recording, quality management, etc. Within the transaction processing layer 202 are several drivers which are implemented to allow for access to the various applications within the integration framework layer 203. The various applications within the transaction processing layer 203 may or may not support multi-tenancy, but multi-tenancy is achieved by the drivers at the transaction processing layer 202 and integrated into the user interface at the application layer 201. In this manner, applications from vendors which are not multi-tenant can be utilized by multiple tenants via the abstraction, and the framework may enable rapid deployment, scalability and reconfiguration. Using this abstraction, a separation may be maintained for the various customers or tenants. Thus, each application may be private and organized or segregated for each tenant. In this manner, the user interface is abstracted from the underling infrastructure, providing the flexibility to develop or license various applications which may or may not support multi-tenancy.

Figure 3:
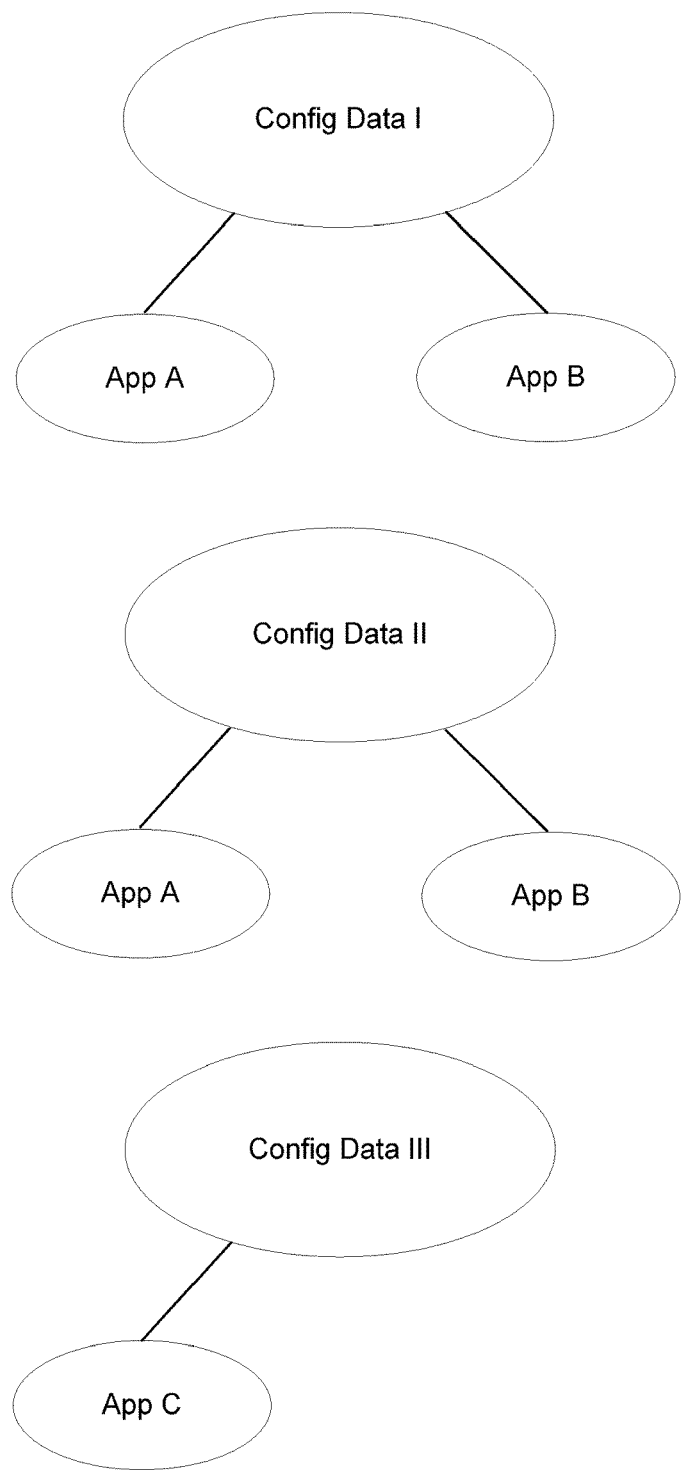
FIG. 3 illustrates and example of the hierarchy for configuration data for each application within the application layer, in accordance with embodiments of the invention.

Referring to FIG. 3, the hierarchy of how configuration data for each application within the application layer may be specified is illustrated, in accordance with embodiments of the invention. As shown in FIG. 3, configuration data may be provided for various applications, and allows for different configurations for different applications using one instance of the installation of such application. For example, Config Data I may represent configuration data for two applications App A and App B; Config Data II may represent configuration data for two applications App A and App B; and Config Data III may represent configuration data for one application App C. Configuration data may include customization preferences of certain tenants. For example, configuration data may include setup skills of agents who answer calls (e.g., a certain tenant has 100 agents who are skilled in business, another 100 agents who are skilled in claims processing, etc.). The configuration data may allow various tenants the capability of grouping individual agents into groupings of agents, designating certain groups of agents to answer certain types of calls, may allow for groupings of agents, or other configurations which implement a tenant's customization preferences. The configuration data may also be shared and moved between applications. For example, Config Data I may be associated and used for App A and App B, and Config Data II may also be associated with and used for App A and App B, where App A and App B are each installed only once.

The configuration data may also allow various views of the applications to be provided (or different customizations of the user interfaces of an application). More specifically, the configuration data may specify how the views of an application are displayed, how data is output by the application, how the data is used by an application, etc. For example, Config Data I may provide for a certain view (such as the view that may be applicable to IT administrators) of App A and App B. In such manner, a tenant may be allowed access into certain views or a certain combination of views for specific applications. Each tenant's access to the customized views, data, and input into specific applications is completely separated from other tenants; in this manner, each tenant may operate various applications within their own tenant-environment. Rather than requiring separate licenses from vendors, by utilizing instances of various applications, it may be the case that only a single license is required from a vendor for a single installation of an application, rather than separate licenses for each tenant.

FIG. 4 illustrates how configuration data for each application may be implemented by various tenants and among various agents, in accordance with embodiments of the invention. As shown in FIG. 4, the configuration data may be specific to particular tenants. For example, Tenant 1 may have Config Data I and Config Data III, meaning that Tenant 1 is associated with and granted usage of the configuration data for Apps A, B and C. Tenant 1 may also employ various agents who only have access to certain applications. This may be because certain agents are only skilled in certain areas or are better equipped to handle certain types of calls or applications. Thus, in the example shown in FIG. 4, Agent 1 has access to Apps A, B, and C for Tenant 1; Agent 6 has access to Apps A, B, and C for Tenant 1, but only Apps A and B for Tenant 3.

In this manner, configuration data (1) may allow different configurations for different applications among one application install; (2) may provide for data moving between applications (e.g., one reporting/admin app governing other vendor's apps for data); (3) may allow each application from different vendors to be set up with the customization preferences of each tenant where such setup is accomplished with the services integration platform as a whole rather than for each application. Where some applications are multi-tenant and others do not support multi-tenant functionality, by utilizing configuration data and the abstraction layers described above, the services integration platform may accomplish multi-tenancy for all applications offered through the platform. This architecture for the multi-tenancy management framework may provide the flexibility to cross associate agent resources with more than one tenant and the ability to include or exclude applications for the users association by tenant. Applications can be customized to support an agent's user preferences, skill level, permissions, and other properties within a tenant so that the applications can be administered and provisioned with complete separation from the other tenants. For example, Application A could be a skills based application which the invention can associate and configure for Agents 1 and 2 where both Agents 1 and 2 can set their own user preferences within the application.

Thus, multiple levels of control and specificity may be provided in a multi-tenant system. In some embodiments, two or more levels, three or more levels, four or more levels, five or more levels, or six or more levels of control and/or specificity may be provided. Examples of levels may include specified configuration data and/or applications. For example, a tenant may select one or more configurations from a plurality of available configuration options. In some instances, the available configuration options may be provided system-wide across multiple tenants, or may be provided only for individual tenants. A tenant may create a customized configuration. A configuration may include the selection of one or more applications from a plurality of available application options and/or the creation of a customized application. An application may include the selection of one or more agents from a plurality of available agents and/or the creation of a customized agent group. In some instances, one or more of the configuration data, applications, and/or agents may be supported across multiple tenants. The control and/or specificity may dictate which agents and/or groups of agents may respond to a call and/or when or how the agents respond to a call. The control and/or specificity may also dictate the views presented to one or more user of a tenant's system, such as an agent or administrator.

Figure 5:
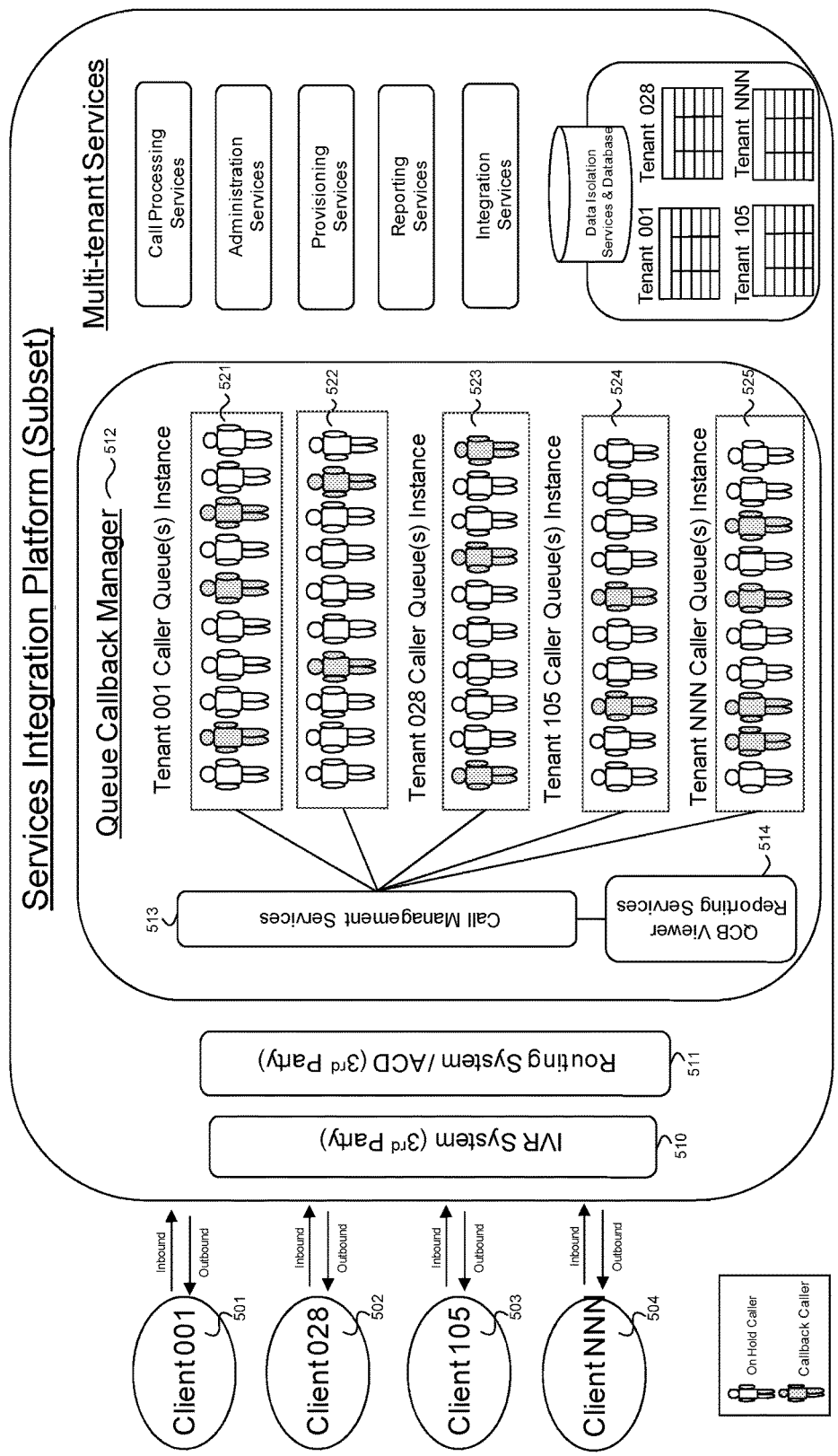
FIG. 5 illustrates an example of an architecture of a multi-tenant queue callback manager application, in accordance with embodiments of the invention.

Referring to FIG. 5, an example of an architecture of a multi-tenant queue callback manager application is illustrated, in accordance with embodiments of the invention. A queue callback manager application may be one of many applications provided as part of the multi-tenant services offered via a services integration platform. Utilizing a single installation, multiple tenants may specify different configurations for the queue callback manager application. When a caller calls a contact center seeking to be connected to an agent resource, the queue callback manager application may allow the caller to be quoted an expected wait time, and allow the caller to have the choice of a callback based on the system generated estimated wait time or to wait in a queue on hold. As shown in FIG. 5, this application may support multiple tenants (i.e., may support multiple entities, multiple business units within an entity, etc.).

As shown in FIG. 5, various callers 501, 502, 503, and 504 may place calls to one or more contact centers. An IVR 510 and ACD 511 may attempt to route these calls to appropriate agent resources. The queue callback manager 512 may manage the initial contact and re-contact of callers in an efficient and cost effective manner, without having to set up a separate system for each tenant. As shown, various queue instances may be created for various tenants. For example, queues 521 and 522 may be created for Tenant 001; queue 523 may be created for Tenant 028; queue 524 may be created for Tenant 105; and queue 525 may be created for Tenant NNN. Whereas without multi-tenancy, there is a need to set up each queue with a separate system, multi-tenancy allows each queue to be instances and to be replicated. Whereas other systems may eliminate the need to set up each queue within a separate system by running various virtual machine containers, this method presents issues with sharing other multi-tenant services.

Utilizing the architecture presented in FIG. 5, the queue callback manager application 512 may have various caller queue instances, and share call management services 513 and viewer reporting services 514, and other multi-tenant services. Thus, a multi-tenant system and method can be enabled for offering contact back requests for incoming callers across different tenants, providing each caller an estimated wait time based on their environment instance, allowing the caller to disconnect while maintaining their position in their contact center queue instance, and initiating re-contact to the caller to the appropriate resource in their tenant instance when their turn is due. Each tenant may be a company, a division within a company, or a business unit within a division, for example. There may also be a hierarchy of tenants, such that one tenant is a master tenant and other tenants are sub-tenants.

Although multiple queue instances are maintained, the system may consist of a single instance management system that partitions and administers the caller queue instances to provide separation between the caller queues. Within each queue instance, the management services 513 can keep track of where the callers are within the queue, and each queue may be partitioned such that separation is maintained. Multi-tenancy may be achieved through the management framework providing data isolation services that associate users and user organizations with tenants, associates relevant application configurations with tenants, users with applications, and applications with tenants.

Thus, the system may include multi-tenant administration services that are used for administering each and every agent queue instance so the specific queues can be monitored, adjusted, or flushed in real time without any effect on the other agent queues. The system may also include multi-tenant reporting services 514. The reporting services 514 may provide various statistics, such as how tenants are charged, etc., and may have real-time views of every caller waiting in a queue instances. The real-time views may display which callers are either physically holding on line or which callers have elected to be contacted back and are holding their place in line, for example. Other multi-tenant services may also be offered such as call processing services, administration services, provisioning services, reporting services, integration services, or data isolation services. For example, administration services may designate which agents serve which caller queues; provisioning services may provide for a way to set up and implement queues for tenants; and data isolation services and databases may keep track of where every caller is within the queue instance.

Figure 6:
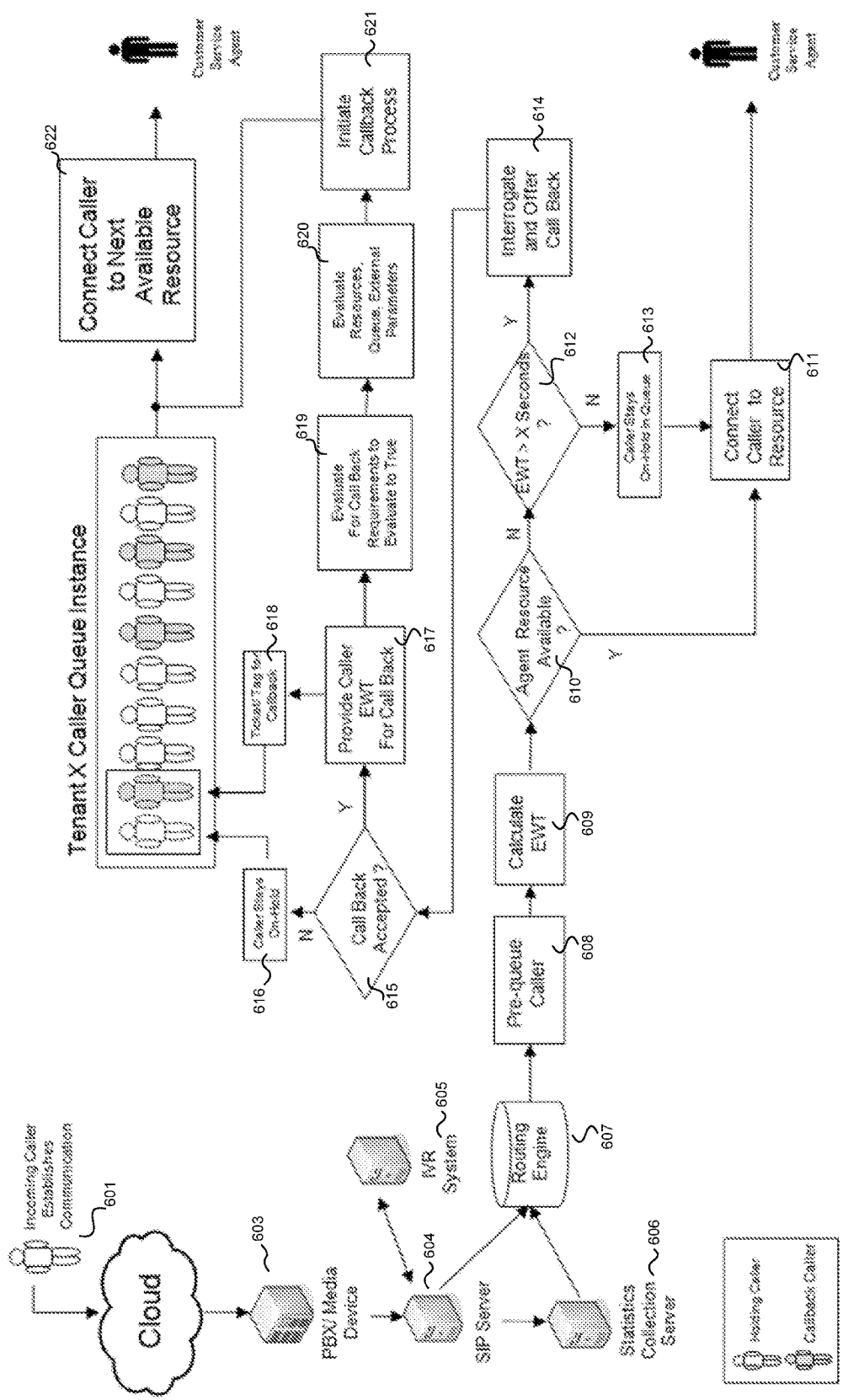
FIG. 6 illustrates an example of a flowchart for the operation of a queue callback manager application, in accordance with embodiments of the invention.

Referring to FIG. 6, a flowchart for the operation of a queue callback manager application is provided, in accordance with embodiments of the invention. Since callers generally do not like being placed on hold and experiencing long wait times when trying to access agent resources, the queue callback manager application may give callers a choice to wait on hold or to receive a call back at a promised time from a skilled agent that is able to support the caller. In step 601, an incoming caller establishes communication through a network 602. In step 603, a PBX or media device receives the call, in step 604, the call is handled by a SIP server. In step 605, an IVR system may provide an automatic pre-recorded response. In step 606, a statistics collection server may collect and store certain information. In step 607, a routing engine will handle the call. In step 608, the caller may be placed in an initial queue. In step 609, the caller's estimated wait time may be calculated. If an agent resource is immediately available in step 610, then the caller may be connected to the resource in step 611. If an agent resource is not immediately available to assist the caller in step 610, and if the estimated wait time is less than a certain threshold of X seconds in step 612, then the caller will be placed on hold in step 613 and connected to a caller resource in step 611 when one becomes available.

If an agent resource is not immediately available to assist the caller in step 610, and if the estimated wait time is greater than a certain threshold of X seconds in step 612, then the caller will be asked if they prefer a call back in step 614. If the caller does not choose to receive a callback in step 615, then the caller will remain on hold in step 616 and remain in the caller queue instance for the specified tenant. If the caller chooses to receive a callback in step 615, then the caller will be provided an estimated wait time for the callback in step 617, the caller will be tagged or ticketed for a callback in step 618 and will remain in the caller queue instance for the specified tenant. In step 619, if the callback requirements (e.g., if the caller provided a callback number) are true, then in step 620, the resources, queue and external parameters are evaluated (as further described below). In step 621, the callback process is initiated and in step 622, the caller is connected to the next available resource (customer service agent).

Additional enhancement for the customer experience and enhancements for system optimization may also be implemented. For example, if a caller is reluctant to accept a callback offer, then the caller may choose to remain on hold and remain in the caller queue. While on hold, the caller may then opt to get a callback by actively making a selection (such as pressing the * key). In some instances, while on hold, the caller may be presented with an updated estimated wait time. Another option or enhancement may be to offer a callback for a caller at a specific time (instead of providing an estimated callback time). Additionally, if a caller does not answer the callback, the caller may be left an option or may be sent a message (such as a text message) which allows the caller to place another call to the call contact center with high priority. There may also be an option for a caller who has elected to receive a callback to, at any point, call back to the call contact center and opt back into the on-hold queue with a higher priority.

Other databases and subsystems may be accessed to gather additional information for each tenant to optimize call decision making. For example, various variables relating to the resources available to a tenant may be taken into account, such as the forecast and schedule of agent resources, vacation of agent resources, efficiency of agent resources, etc. Schedule information may be analyzed to determine agent capacity before a callback is made, which may provide for more efficient utilization of agent resources.

FIG. 7 illustrates one example of an equation to calculate estimated wait time for predicting how long a caller will wait in a caller queue before speaking live with a properly skilled agent or resource, in accordance with embodiments of the invention. The estimated wait time calculation takes into account: (1) how many other callers are in queue; (2) the total number of agents available; (3) the total number of agents with the target skill set; (4) the speed at which the agents with the target skill set are answering callers within a current sampling window; (5) the volatility of recent average speed answer by the target agent skill group; and (6) the currency of all sampled information used to predict EWT. The calculation may rely on certain historical information to take a sample (for example, the current sampling window may be 15 seconds). Further, the volatility of recent average speed answer by the target agent skill group may be normalized.

As shown in FIG. 7, if the average speed of answer computed by skilled agents for the last N seconds for the relevant queue is greater than 0, then this means that during the sampling window, there was at least one call answered and the estimated wait time will be calculated as the sum of the average speed of answer plus the number of calls currently in the queue for the specific skill group. For example, if N=20 seconds and the average speed of answer computed by skilled agents for the last 20 seconds in the relevant queue was 40 seconds, and there are 10 calls waiting in queue, then the estimated wait time will be 50 seconds. This part of the calculation is designed to calculate EWT accurately for larger agent pools of greater than 10 agents and large caller pools where the arrival rate of callers can provide at least 2 samples within the sampling window of N seconds for the target agent pools.

If, however, the average speed of answer computed by the skilled agent for the last N seconds for the relevant queue is not greater than 0, then the estimated wait time will be calculated based on various other historical factors such as the agent ratio and queue ratio as shown in FIG. 7. For the purposes of this calculation, agents are only considered ready if they have been in the ready state for more than 5 seconds or at some other preset time parameter. The alternative calculation is useful for calculating EWT accurately for small queues that are being handled by a few agents where the incoming call traffic volume is sporadic. For example, if the average speed of answer across all target queues is 40 seconds and there are 50 callers waiting in queue where the calculated Agent Ratio is 3.0 and the calculated Queue Ratio is 3.5 where there are 10 agents ready at that time to help callers, then the estimated wait time will be 95 seconds.

The punctuality of the estimated wait time algorithm and an alternative system for calculating estimated wait time was tested against many variations of large and small queues real sample data. Test results showed that the punctuality of the estimated waited time algorithm was consistently higher than 90% accurate within a 2 minute deviation range when compared with the actual wait time experienced by callers. The alternative system for calculating estimated wait time was also tested for comparison where its calculations are primarily driven by average hold time, number of skilled agents available, and number of callers in queue. Test results showed that the punctuality for the alternative algorithm averaged from 70% to 80% accurate within a 2 minute deviation range when compared with the actual wait time experienced by callers. Based on these test results the estimated wait time algorithm was significantly more accurate than the alternative system.

Figure 8:
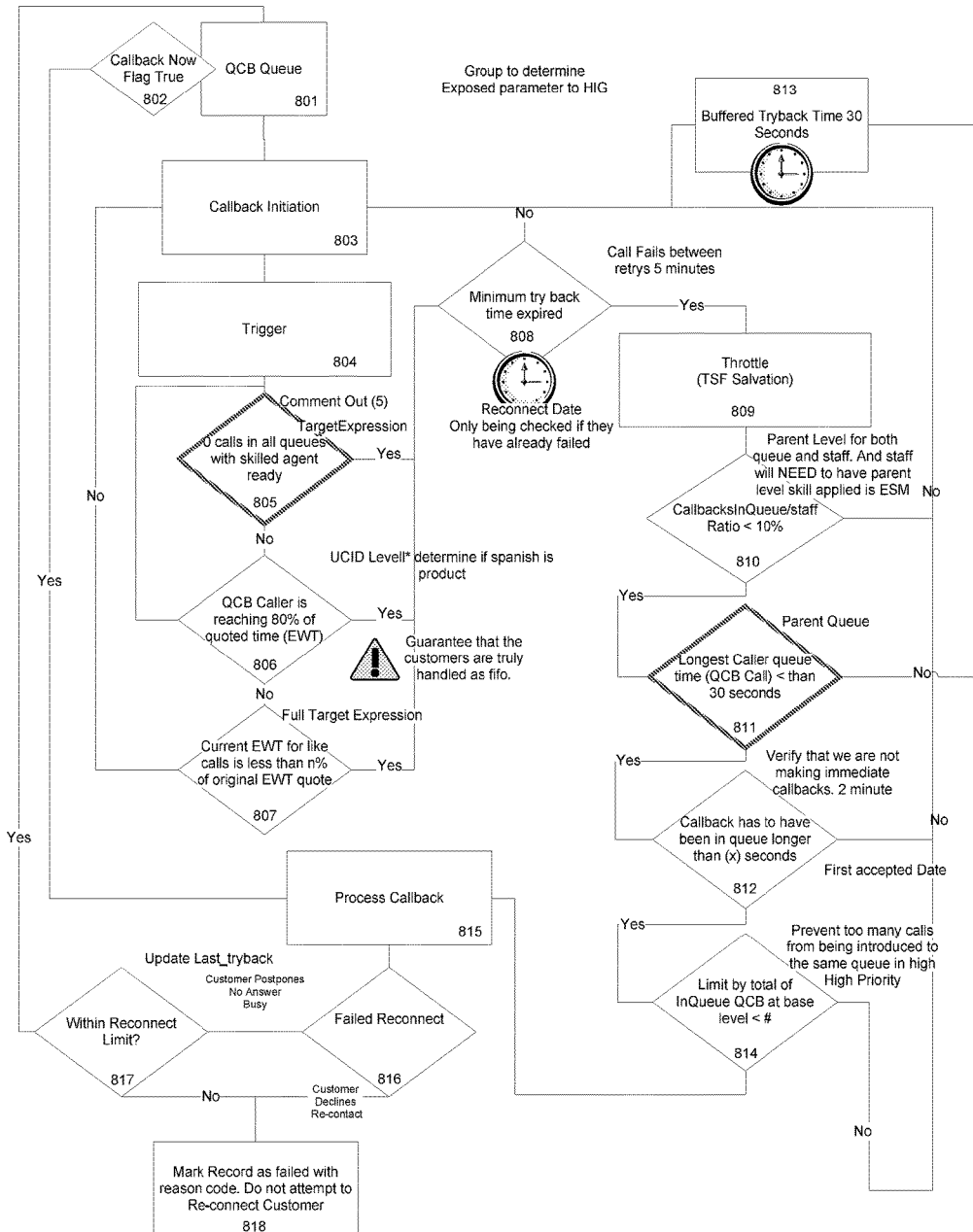
FIG. 8 illustrates a flowchart for improving the reconnection of a caller to a target agent resource when a callback is initiated, in accordance with embodiments of the invention.

FIG. 8 illustrates a flowchart for improving the reconnection of a caller to a target agent resource when a callback is initiated, in accordance with embodiments of the invention. When a callback is initiated, the system will use the flowchart illustrated in FIG. 8 to determine when to callback a caller for the fastest reconnection to the target agent resource without disruption and within the time frame closest to the promised estimated wait time. This process of callback initiation takes into account: (1) estimated wait time promised; (2) number of actual calls in queue with skilled agent (situational changes); (3) callbacks in queue can be serviced by the current level of available staffing; (4) longest caller queue time is less than N seconds (setting to a desired service level threshold) (e.g., a company may require this "N" to be 30 seconds); (5) callback event has to have waited in queue longer than P seconds (e.g., if the estimated wait time promised is 5 minutes, but an agent resource immediately becomes available, the P seconds may be set to 2 minutes to avoid having the system provide the caller with an immediate callback which may be a nuisance); and (6) automatic throttle to prevent too many high priority calls from being introduced to the same queue.

As illustrated in FIG. 8, when a caller's turn is approaching, various parameters or variables may be checked before the callback is initiated, to ensure a very high level of success for the caller to be connected to an agent resource as quickly as possible. The caller is first placed in a callback queue in step 801 and may elect to receive a callback in step 802. In step 803, the system may evaluate several triggers (804) before the callback initiation to make sure all necessary customer resources needed to service the customer will be available when that caller is reconnected. Triggers (804) may include if there are 0 calls in all queues with skilled agents ready (805), if the caller is reaching 80% of their quoted estimated wait time (806), and if the current estimated wait time for similar calls is less than n % of the original estimated wait time quote (807). If any of these triggers are true, then the system may check to see whether a certain minimum try back time has expired yet or not (808). When this minimum try back time expires, then several factors are considered including whether a ratio of callbacks to number of staff is less than 10% (810), whether the longest caller in the queue is less than 30 seconds (811), whether the callback has been in the queue longer than X seconds (812), and whether there are too many calls in the queue at a high priority (814). If these throttle factors are false, then additional time may be added to the minimum try back time (813). If the throttle factors are true, then the callback may be processed (815).

In the event that the reconnect or callback is failed (for example, if the caller does not pick up), then there may be a certain time within which the process is re-started and another callback may be attempted. If the caller declines the reconnect or callback, then the denial may be recorded accordingly. Utilizing this flowchart and taking into account the various trigger and throttle factors may allow the system to re-connect the caller as fast as possible to ensure that the caller can talk to the customer service rep in the shortest amount of time.

Aspects of the systems and methods described may be implemented as functionality to provide multi-tenant services for use with mobile applications and/or web applications. Systems and methods provided therein may be accessible by and/or implemented using mobile devices (e.g., smartphone, PDA, cellular phone, tablet) and/or static devices (e.g., personal computer, workstation). In one example, systems and methods may be capable of providing mobile device users and/or web users with any functionality described herein, which may include specification of configurations for one or more tenants, estimated wait times and call back capabilities.

The underlying systems and methods can provide these services using text communication channels including chat and short message services in addition to voice channels. Any description herein relating to calls or callers may also apply to chat services (e.g., via text, audio, and/or video), email services, message services (e.g., text message), or any other forms of communication. Any form of communication may be initiated by a caller, and any description of a caller may apply to an individual that initiates any form of communication, such as a telephone phone or any other forms described therein. Similarly, any form of communication (e.g., telephone call or other forms described herein) may be used to respond to the caller. The response may include a callback to the caller, a connection that is made between the caller and call center agent, and/or an indication to the caller of the expected wait time for a callback (at the onset of the caller's initiated communication or updates provided subsequently). Any description of a callback may include any form of communication. The response may take the same form as the communication initiated by the caller (e.g., if the caller calls via telephone, the caller receives a telephone call back) or may take a different form as the communication initiated by the caller (e.g., if the caller calls via telephone, the caller hears an expected callback time, selects a callback option, and receives a text updating the callback time).

For further examples, an individual may "call in" to a service by initiating a communication, such as contact via a chat session (e.g., via text, audio, and/or video) of a web site, or a chat via a mobile device. In some embodiments, one or more agents may be available to respond to the communication (e.g., enter a chat session, or text or email back). The one or more agents may respond in accordance with the data configuration for the tenant that the individuals are communicating with, and/or in accordance with the appropriate call center application. In some instances, when the communication request is made, an appropriate agent may not be available at the time. For example, the communication request may specify a need of the caller that can be met by an agent with an appropriate skillset. An expected wait time for an appropriate agent to become available may be calculated. The calculation may occur in accordance with one or more calculation described herein, or other calculations known in the art. The expected wait time may be presented to the caller, using one or more of the communication techniques described herein. The caller may be presented with an option of remaining on hold or receiving a callback. The caller's selection may be received and one or more steps may be initiated in response.

In some embodiments, the callers may be utilizing an application on a mobile device to initiate a communication, and/or receive a response to the communication. The caller may automatically receive a response to the communication via the same device. Alternatively, the caller may specify a different device through which to receive the communication. In some instances, an agent may interface with the caller via a mobile device of the agent. Alternatively, one or more of the devices utilized by the caller and/or agent need not be a mobile device.

Similarly, a user of the systems and methods described herein, such as an administrator for a tenant may utilize an application on a mobile device, or any other type of device. For example, an administrator may specify and/or adjust configuration data and/or applications through an interface provided on a mobile device or other type of device. In other examples, a system-wide administrator that may be capable of interacting with one or multiple tenants may interact with the system via a mobile device or any other type of device.

All concepts of the invention may be incorporated or integrated with other systems and methods of multi-tenant call center systems, including but not limited to those described in U.S. Patent Publication No. 2005/0025303 (Hostetler) published on Feb. 3, 2005 and U.S. Pat. No. 6,788,779 (Ostapchuck) issued on Sep. 7, 2004, which are hereby incorporated by reference in their entirety.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While this invention has been described and illustrated with reference to particular embodiments, it will be readily apparent to those skilled in the art that the scope of the invention is not limited to the disclosed embodiments but, on the contrary, is intended to cover numerous other modifications and equivalent arrangements which are included within the spirit and scope of the following claims.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Any description of computer-readable media may include non-transitory and/or tangible computer readable-media. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. A system for managing multi-tenant callback services for customer contact centers comprising:
    a processor;
    a memory, wherein the memory has stored therein instructions that, when executed by the processor, cause the processor to:
        receive configuration data for first and second contact center tenants;
        associate the configuration data with a contact center application, wherein the contact center application is configured to support the first and second contact center tenants via a shared installation of the contact center application, wherein each tenant has a virtual partition on which instances of the shared installation of the contact center application is run;
        receive first and second requests from first and second customers for respectively first and second resources of the first and second contact center tenants;
        monitor position of the first customer in a first queue instance associated with the first tenant, and position of the second customer in a second queue instance associated with a second tenant, the first and second queue instances each running in the virtual partition provided for respectively the first and second tenants; and
        provide via one of the instances of the contact center application, a first command to contact the first customer in response to the monitoring of the position of the first customer in the first queue instance;
        provide via another one of the instances of the contact center application, a second command to contact the second customer in response to the monitoring of the position of the second customer in the second queue instance; and
    a communication device coupled to the processor and adapted to contact the first and second customers in response to respectively the first and second commands.

2. The system of claim 1, wherein the processor is further configured to identify configuration data for the first and second contact center tenants, the configuration data including information on agent skills.

3. The system of claim 1, wherein the instructions further cause the processor to:
    calculate an expected wait time for the first customer.

4. The system of claim 3, wherein a first formula is used to calculate the expected wait time if at least one call was answered during a particular sampling window, and a second formula different from the first formula is used to calculate the expected wait time if no call was answered during the particular sampling window.

5. The system of claim 4, wherein the first formula is configured to compute the expected wait time as a sum of an average speed of answer during the particular sampling window plus a number of calls currently in the first queue instance for a specific skill group.

6. The system of claim 4, wherein the second formula is configured to compute the expected wait time based on an average speed of answer computed across a plurality of queues during the particular sampling window.

7. The system of claim 1, wherein the instructions further cause the processor to:
    adjust the first queue instance in real time without affecting the second queue instance.

8. The system of claim 1, wherein the virtual partitions are configured to provide separation between the first and second queue instances.

9. The system of claim 1, wherein the contact of the first and second customers are callback calls to the first and second customers.

10. The system of claim 1, wherein the resources of the first and second contact center tenants include agents associated with the first and second contact center tenants.

11. A method for managing multi-tenant callback services for customer contact centers comprising:
receiving, by a processor, configuration data for first and second contact center tenants;
associating, by the processor, the configuration data with a contact center application, wherein the contact center application supports the first and second contact center tenants via a shared installation of the contact center application, wherein each tenant has a virtual partition on which instances of the shared installation of the contact center application is run;
receiving, by the processor, first and second requests from first and second customers for respectively first and second resources of the first and second contact center tenants;
monitoring, by the processor, position of the first customer in a first queue instance associated with the first tenant, and position of the second customer in a second queue instance associated with a second tenant, the first and second queue instances each running in the virtual partition provided for respectively the first and second tenants; and
providing, by the processor, via one of the instances of the contact center application, a first command to contact the first customer in response to the monitoring of the position of the first customer in the first queue instance;
providing, by the processor, via another one of the instances of the contact center application, a second command to contact the second customer in response to the monitoring of the position of the second customer in the second queue instance;
establishing, by a communication device coupled to the processor, contact with the first and second customers; and
establishing, by a media device, contact of the first and second customers in response to respectively the first and second commands.

12. The method of claim 11 further comprising identifying, by the processor, configuration data for the first and second contact center tenants, the configuration data including information on agent skills.

13. The method of claim 11 further comprising:
calculating, by the processor, an expected wait time for the first customer.

14. The method of claim 13, wherein a first formula is used to calculate the expected wait time if at least one call was answered during a particular sampling window, and a second formula different from the first formula is used to calculate the expected wait time if no call was answered during the particular sampling window.

15. The method of claim 14, wherein the first formula is configured to compute the expected wait time as a sum of an average speed of answer during the particular sampling window plus a number of calls currently in the first queue instance for a specific skill group.

16. The method of claim 14, wherein the second formula is configured to compute the expected wait time based on an average speed of answer computed across a plurality of queues during the particular sampling window.

17. The method of claim 11, wherein the method further includes:
adjusting the first queue instance in real time without affecting the second queue instance.

18. The method of claim 11, wherein the virtual partitions are configured to provide separation between the first and second queue instances.

19. The method of claim 11, wherein the contact of the first and second customers are callback calls to the first and second customers.

20. The method of claim 11, wherein the resources of the first and second contact center tenants include agents associated with the first and second contact center tenants.

* * * * *